Sept. 13, 1927.
I. G. SVIAGENINOV
1,642,094
CASTER ATTACHMENT FOR TRUNKS
Filed Nov. 23, 1926
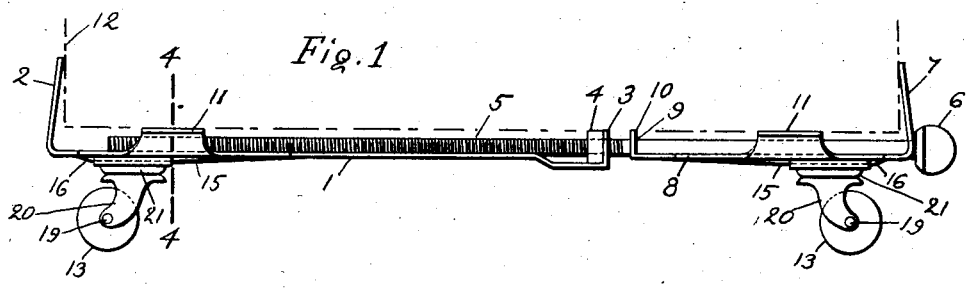
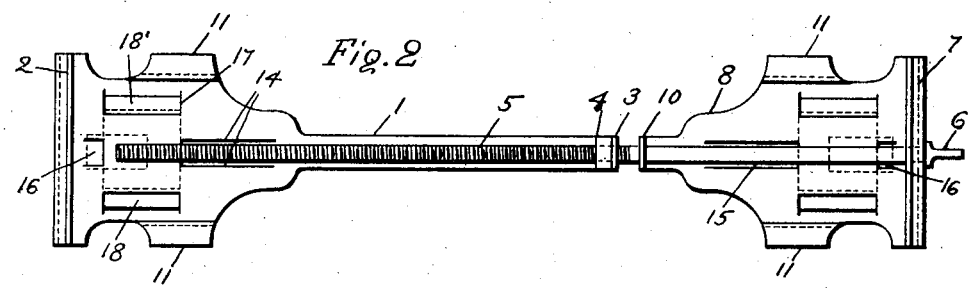
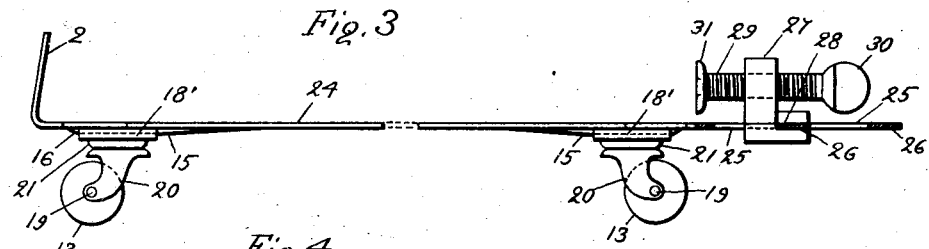
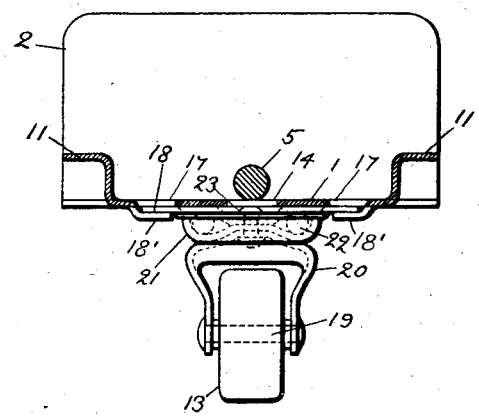
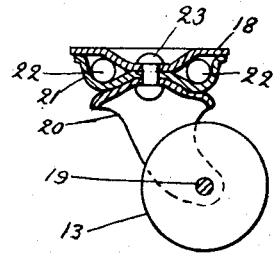
IVAN G. SVIAGENINOV
INVENTOR.
BY John P. Nixonow
ATTORNEYS.

Patented Sept. 13, 1927.

1,642,094

UNITED STATES PATENT OFFICE.

IVAN G. SVIAGENINOV, OF NEW YORK, N. Y.

CASTER ATTACHMENT FOR TRUNKS.

Application filed November 23, 1926. Serial No. 150,236.

My invention relates to caster attachments for trunks and has a particular reference to attachments adapted to be clamped underneath to a trunk and provided with swiveled rollers or casters.

The object of my invention is to provide an attachment which can be easily and quickly attached to a trunk and would enable one to move the trunk around on the floor on casters of this attachment. My attachment is especially convenient for wardrobe trunks enabling one to open the halves of such trunk with ease and without scratching the floor or the carpet on which the trunk may be placed.

My invention is more fully described in the accompanying specification and drawing in which—

Fig. 1 is an elevation of my attachment. Fig. 2 is a plan view, Fig. 3 is an elevation of a modified device, Fig. 4 is a sectional view taken on the line 4—4 of Fig. 1, and Fig. 5 is a sectional view of a caster member.

My attachment consists of a clamping member 1 with a lug or hook 2 and a smaller lug 3 retaining a nut 4 for a screw 5. The head 6 of this screw rests against a hook 7 of a second clamping member 8. The body of the screw is guided by an aperture 9 in a lug 10. Raised portions 11 form supports for the bottom of a trunk 12. The end portions of the clamping members 1 and 8 are adapted for supporting casters with wheels 13. For this purpose slots 14 are cut through the body of each clamping member forming a tongue 15 which is then slightly bent down. A similar but shorter tongue 16 is formed opposite the first tongue and is also bent down. Slots 17 are cut at the sides forming lips which are also bent down in order to provide sufficient clearances for a top plate 18 of a caster.

The caster is formed of a wheel 13 rotating on a pin 19 supported in a yoke or clevis 20. A steel cup 21 is placed on top of the clevis 20 forming a race for steel balls 22. The upper race for these balls is formed with the plate 18.

The clevis and plates 18 and 21 are joined together by a pin 23 the ends of which are provided with enlarged heads, retaining together parts 18, 20 and 21. The clevis 20 and the ball race 21 are provided with enlarged apertures for the pin 23 and can freely rotate on same and on the balls 22.

The caster is assembled on the clamping bar 1 by sliding the plate 18 over depressed lug 16 and with the side edges of the plate 18 fitting underneath the lips 18' until the front edge of the plate 18 rests against the tongue 15. The temporarily depressed lug or tongue 16 snaps back, forming a retaining lug for the rear edge of the plate 18 which becomes thereby firmly wedged in its position at the bottom surface of the clamping bar 1.

The other caster is similarly assembled on the second clamping bar 8.

The complete attachment formed of two clamping bars 1 and 8 with their casters and a screw 5 is fitted underneath the trunk at one side and clamped in its place by turning the screw 5. A second attachment is clamped at the other side under the trunks, so that there will be a caster under each corner of the trunk.

A modified arrangement is shown in Fig. 3. Here the casters are mounted at the ends of a clamping bar 24 provided on one end with a lug 2. The other end is provided with a number of rectangular apertures 25 forming bridges 26 between them. A bracket 27 is inserted into one of such apertures and is fitted with its slot 28 on one of such bridges 26. It is provided with a threaded hole for a screw 29 with a thumb head 30 and a clamping washer 31.

The bracket 27 is placed into one of the apertures 25 according to the width of a trunk, and the attachment is clamped in its position by turning the screw 29 until the trunk becomes tightly wedged between the lug 2 and the clamping washer 31.

Important advantages of my attachment are that it can be conveniently and easily attached to any ordinary trunk, box, piece of furniture etc., it can be carried inside of the trunk until needed, and also it is simple and cheap to manufacture, being made of metal stampings from a flat material, preferably sheet steel.

I claim as my invention:

In a caster attachment for trunks, the combination with two flat members of a screw adjustably connecting said members, hooks on the ends of said members for a trunk, said screw passing through an aperture in one of said hooks, a thumb head on said screw extending outside of said hook and adapted to be operated when said caster attachment operatively supports a trunk, casters adapted to support said attachment, the upper portions of said casters being of a substantially flat and rectangular shape fitting against the lower surface of said flat members, hooks on said flat members adapted to engage the upper rectangular portion of each caster at opposite sides, said rectangular portion being adapted to slide between said hooks, and a resilient lug adapted to retain said rectangular portion in its position between said hooks.

Signed at New York in the county of New York and State of New York this 19th day of November A. D. 1926.

IVAN G. SVIAGENINOV.